April 18, 1967 T. M. McDONNELL Re. 26,190

SWIVEL BRACKET

Original Filed Oct. 16, 1963

INVENTOR.
Thomas M. McDonnell
BY Richard W. Carpenter
Atty.

United States Patent Office

Re. 26,190
Reissued Apr. 18, 1967

26,190
SWIVEL BRACKET

Thomas M. McDonnell, 2918 Madison, Bellwood, Ill. 60104

Original No. 3,184,200, dated May 18, 1965, Ser. No. 316,701, Oct. 16, 1963. Application for reissue Sept. 6, 1966, Ser. No. 582,193
1 Claim. (Cl. 248—240)

Matter enclosed in heavy brackets [ ] appears in the original patent but forms no part of this reissue specification; matter printed in italics indicates the additions made by reissue.

This invention relates to display devices, and more particularly to commercial and home use in displaying merchandise and decorative items.

This invention comprehends an improved apparatus for more flexibility in displaying merchandise, or other items to be offered for public, or private viewing.

Although various instruments have been devised for this purpose, few, if any have the relative simplicity in design and construction necessary to make them both interesting and practical and, at the same time, relatively inexpensive to produce.

It is, therefore, a primary object of this invention to provide a practical and relatively simple device as an aid in the displaying of items in many and varied positions as desired.

A more specific object of the invention is the provision, in a device of the type described, of an arrangement for rotating the display bracket to any desired angle after desired adjustment to desired vertical height is made, on the slotted standard, to which it will be attached.

These and other objects of the invention will be apparent from an examination of the following description and drawing, wherein.

Figure 1:
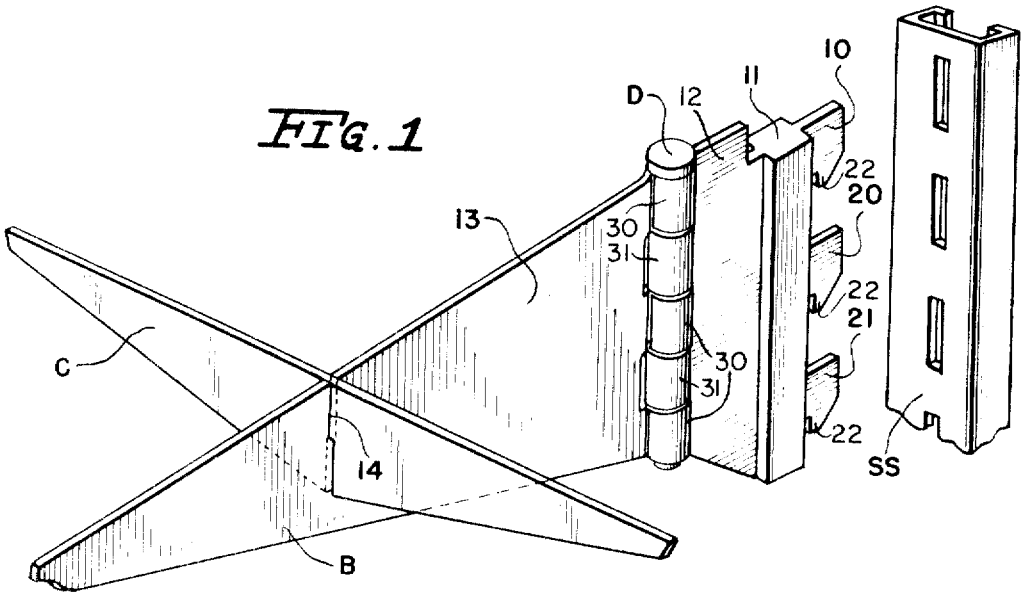
FIGURE 1 is a perspective view of a swivel bracket arrangement embodying features of the invention.
Figure 2:
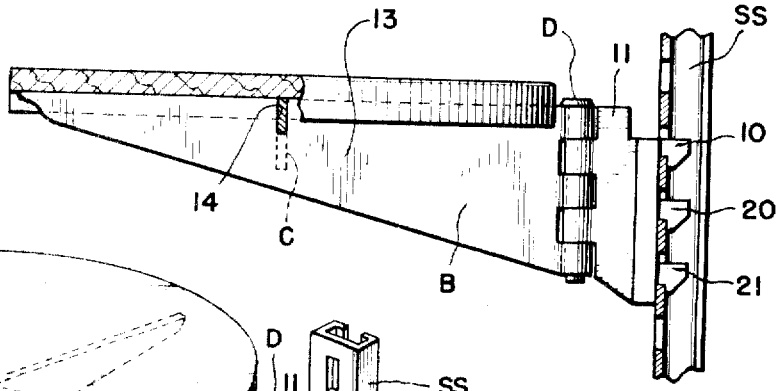
FIGURE 2 is a side elevation of a portion of the structure illustrated in FIGURE 1.
Figure 3:
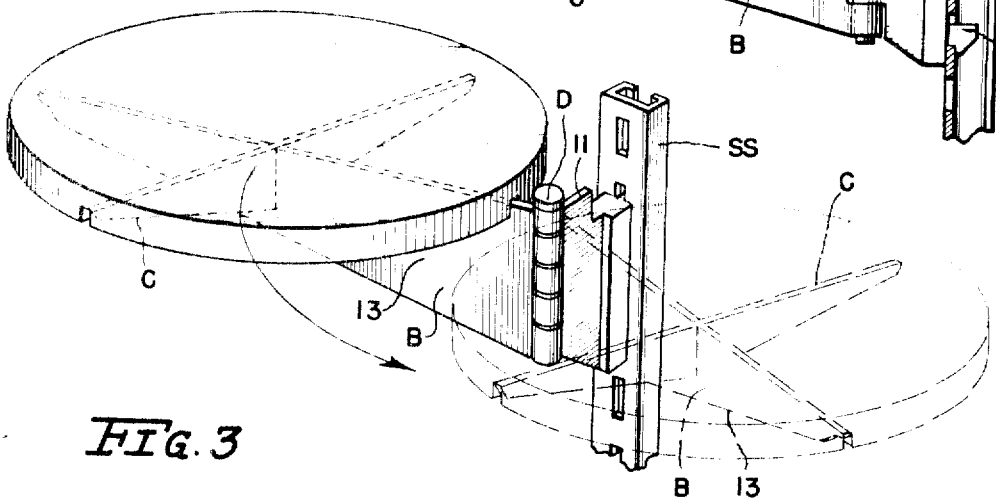
FIGURE 3 is a view similar to FIGURE 1, but illustrating the pivotal movement of the hinged portion of the structure.

It will be understood that certain elements have been omitted from certain views where they are illustrated to better advantage in other views.

Referring now to the drawings for a better understanding of the invention, it will be seen that the invention includes a mounting member, indicated generally at 11, adapted to be removably positioned within vertically spaced slots of a conventional display shelf standard SS and having a shelf supporting bracket B pivotally connected thereto by a hinge pin D.

The bracket B includes a longitudinal vertical plate or arm 13 having a notch 14 medially of its upper surface within which is disposed a transverse vertical plate or arm C. The plates are disposed at right angles to each other with their upper surfaces being co-planar to provide a support for a shelf (not shown).

At one end plate 13 is provided with a plurality of vertically spaced barrels 30 which mate with a plurality of complementary barrels 31 projecting from one side of plate 12 mounting member 11, so that the bracket plate and mounting member plate can be pivotally interconnected by a vertical hinge pin D.

On its opposite side mounting member 11 presents a flat vertical surface adapted for full face abutting engagement with an opposing flat, vertical surface of slotted standard SS.

Projecting outwardly from the flat surface of mounting member 11 are a plurality of transversely aligned locking lugs 10, 20, and 21, which are spaced vertically from each other a distance equal to the vertical space between adjacent slots of standard SS.

Locking lugs 10, 20, and 21 are each provided at their lower extremity with an outer extended portion 22 spaced outwardly from the flat surface of member 11 a distance equal to the thickness of the slotted wall of standard SS.

Thus, when the mounting member is placed against the standard with its locking lugs projecting into related slots of the standard, the mounting member can be moved downwardly slightly to engage the extended portions of the member behind the front wall of the standard.

Because of the full face engagement between the member and the standard, there is achieved a rigid, though detachable, connection therebetween.

The hinge or pivotal connection between the mounting member and the shelf supporting bracket permits the varied positioning of the shelves so that a plurality of shelves can be mounted in a similar manner on a common standard, with the shelves being staggered as desired for greater efficiency or artistic effect.

I claim:

A swivel bracket and standard arrangement for supporting a shelf, comprising:

(a) a vertically disposed standard having a flat wall presenting a plurality of transversely aligned, vertically spaced slots;

(b) a shelf supporting bracket including a pair of interconnected [vertical plates] *arms* disposed at [right] angles to each other; and (c) a mounting member pivotally connected to an end of one of said [plates] *arms* on a vertical axis and rigidly and removably connected to said standard;

(d) said member presenting on one side thereof a flat, vertical surface seated against an outer surface of the flat wall of said standard and having projecting from said flat surface a plurality of transversely aligned locking lugs spaced vertically from each other a distance equal to the distance between the slots of said standard and having on the lower extremities thereof downwardly extending projections spaced from said flat surface a distance substantially equal to the thickness of said flat wall to provide a rigid, removable, interlocking connection between the member and standard when the lugs of the former are positioned within the slots of the latter.

References Cited by the Examiner

The following references, cited by the Examiner, are of record in the patented file of this patent or the original patent.

UNITED STATES PATENTS

| | | | |
|---|---|---|---|
| 827,540 | 7/1906 | Krahmer | 248—240 |
| 1,575,270 | 3/1926 | Jankowsky | 211—87 |
| 1,805,793 | 5/1931 | Wittemann | 211—96 |
| 2,127,280 | 8/1938 | Zimbalist | 248—243 |
| 2,220,468 | 11/1940 | Vasseur | 248—205 |
| 2,713,985 | 7/1955 | Kleckner | 248—243 |
| 2,895,698 | 7/1959 | Palmer | 248—205 |

CHANCELLOR E. HARRIS, *Examiner.*

CLAUDE A. LE ROY, *Examiner.*